US009745395B2

(12) United States Patent
Meka et al.

(10) Patent No.: US 9,745,395 B2
(45) Date of Patent: *Aug. 29, 2017

(54) PROPYLENE-BASED IMPACT COPOLYMERS

(71) Applicant: ExxonMobil Chemical Patents Inc., Baytown, TX (US)

(72) Inventors: Prasadarao Meka, Seabrook, TX (US); Chon-Yie Lin, Houston, TX (US); Todd S. Edwards, League City, TX (US); Christopher G. Bauch, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,015

(22) Filed: Mar. 4, 2016

(65) Prior Publication Data

US 2017/0022308 A1    Jan. 26, 2017

Related U.S. Application Data

(63) Continuation of application No. 14/567,019, filed on Dec. 11, 2014, now Pat. No. 9,309,334.

(60) Provisional application No. 61/927,632, filed on Jan. 15, 2014.

(51) Int. Cl.
| | | |
|---|---|---|
| *C08L 23/12* | (2006.01) | |
| *C08F 210/06* | (2006.01) | |
| *C08F 10/06* | (2006.01) | |
| *C08L 23/26* | (2006.01) | |
| *C08K 3/34* | (2006.01) | |
| *C08L 23/14* | (2006.01) | |
| *C08L 23/16* | (2006.01) | |
| *C08K 3/00* | (2006.01) | |

(52) U.S. Cl.
CPC ............ *C08F 210/06* (2013.01); *C08F 10/06* (2013.01); *C08K 3/34* (2013.01); *C08L 23/12* (2013.01); *C08L 23/14* (2013.01); *C08L 23/26* (2013.01); *C08F 2500/04* (2013.01); *C08F 2500/11* (2013.01); *C08F 2500/12* (2013.01); *C08F 2500/17* (2013.01); *C08F 2500/24* (2013.01); *C08F 2800/20* (2013.01); *C08K 3/0033* (2013.01); *C08L 23/16* (2013.01); *C08L 2205/03* (2013.01); *C08L 2207/04* (2013.01)

(58) Field of Classification Search
CPC .............. C08F 210/16; C08F 2800/20; C08F 2500/12; C08F 2500/24; C08L 23/12; C08L 23/16; C08L 2205/03; C08L 2205/22

See application file for complete search history.

(56) References Cited

U.S. PATENT DOCUMENTS

| | | | |
|---|---|---|---|
| 5,258,464 A | 11/1993 | McCullough, Jr. et al. | |
| 5,453,466 A | 9/1995 | Pellegatti et al. | |
| 6,087,459 A | 7/2000 | Miro et al. | |
| 6,384,142 B1 | 5/2002 | Burkhardt et al. | |
| 6,399,707 B1* | 6/2002 | Meka .................... | C08F 297/08 525/191 |
| 6,660,808 B2 | 12/2003 | Kim | |
| 7,217,768 B2 | 5/2007 | Salek et al. | |
| 7,309,742 B2 | 12/2007 | Poncelet et al. | |
| 7,348,381 B2 | 3/2008 | Bodiford et al. | |
| 7,449,522 B2 | 11/2008 | Aguirre et al. | |
| 7,482,406 B2 | 1/2009 | News et al. | |
| 7,572,860 B2 | 8/2009 | De Palo et al. | |
| 7,619,030 B2 | 11/2009 | Kawai et al. | |
| 7,649,052 B2* | 1/2010 | Massari .............. | C08L 23/0807 525/191 |
| 7,683,129 B2* | 3/2010 | Mehta .................... | C08L 23/10 428/292.1 |
| 7,714,057 B2 | 5/2010 | Heck et al. | |
| 7,772,324 B2* | 8/2010 | Massari .................. | C08F 10/00 525/191 |
| 7,790,795 B2 | 9/2010 | Schauder et al. | |
| 7,851,554 B2 | 12/2010 | Meka et al. | |
| 7,858,701 B2* | 12/2010 | Datta ..................... | C08L 23/10 525/191 |
| 7,868,104 B2 | 1/2011 | Ravishankar et al. | |
| 7,872,074 B2* | 1/2011 | Massari ................ | C08F 210/06 525/191 |
| 7,935,766 B2 | 5/2011 | Sheard et al. | |
| 7,977,435 B2 | 7/2011 | Lin et al. | |
| 8,022,142 B2 | 9/2011 | Jiang et al. | |
| 8,044,135 B2 | 10/2011 | Doufas et al. | |
| 8,063,160 B2 | 11/2011 | Cavalieri et al. | |
| 8,067,510 B2 | 11/2011 | Sheard et al. | |
| 8,080,607 B2 | 12/2011 | Seliskar et al. | |
| 8,093,335 B2 | 1/2012 | Jiang et al. | |
| 8,198,373 B2 | 6/2012 | Brant et al. | |

(Continued)

FOREIGN PATENT DOCUMENTS

| | | |
|---|---|---|
| CN | 101633763 | 1/2010 |
| EP | 0 877 039 | 11/1998 |

(Continued)

OTHER PUBLICATIONS

U.S. Appl. No. 61/927,632, filed Jan. 15, 2014, Meka et al.

*Primary Examiner* — Rip A Lee

(74) *Attorney, Agent, or Firm* — Kevin M. Faulkner

(57) ABSTRACT

A propylene-based impact copolymer (ICP) and composition including the ICP, the ICP comprising a polypropylene homopolymer and within the range of from 10 wt % to 45 wt % of propylene copolymer based on the weight of the ICP, wherein the copolymer comprises from 20 wt % to 44 wt % ethylene, 1-butene, 1-hexene and/or 1-octene derived units and from 80 to 60 wt % propylene-derived units based on the weight of the propylene copolymer, the propylene-based impact copolymer having a Melt Flow Rate (230° C./2.16 kg) within the range of from 10 g/10 mm to 50 g/10 mm and an Elongation at Break of greater than 70%.

30 Claims, 2 Drawing Sheets

(56) References Cited

U.S. PATENT DOCUMENTS

| | | | |
|---|---|---|---|
| 8,207,272 B2 | 6/2012 | Bernreitner et al. | |
| 8,618,220 B2 | 12/2013 | Reijntjens et al. | |
| 8,802,781 B2 | 8/2014 | Pellegatti et al. | |
| 8,987,400 B2 | 3/2015 | Gloger et al. | |
| 9,303,159 B2 * | 4/2016 | Ciarafoni | C08L 23/12 |
| 9,309,334 B2 * | 4/2016 | Meka | C08F 10/06 |
| 2001/0034411 A1 | 10/2001 | Burkhardt et al. | |
| 2004/0092631 A1 | 5/2004 | Joseph | |
| 2005/0009991 A1 * | 1/2005 | Meka | C08L 23/10 |
| | | | 525/240 |
| 2010/0105848 A1 | 4/2010 | Meka et al. | |
| 2014/0107274 A1 * | 4/2014 | Salek | C08L 23/10 |
| | | | 524/451 |

FOREIGN PATENT DOCUMENTS

| | | |
|---|---|---|
| JP | 1995-309985 A | 11/1995 |
| WO | WO 98/21275 | 5/1998 |
| WO | WO 99/20663 | 4/1999 |
| WO | WO 01/58970 | 8/2001 |
| WO | WO 03/044086 | 5/2003 |
| WO | WO 2012/010678 | 1/2012 |

* cited by examiner

Example 16

30 x 30 μm

*NB RTNI > 10ft-lb/in
Ethylene-propylene rubber: 26.2 wt%
Ethylene in Ethylene-propylene rubber: 35.8 wt%

Comparative Example 10

30 x 30 μm

Ethylene-propylene rubber: 26 wt%
Ethylene in Ethylene-propylene rubber: 56 wt%

PROPYLENE-BASED IMPACT COPOLYMERS

CROSS-REFERENCE TO RELATED APPLICATION

This is a Continuation Application of U.S. Ser .No. 14/567,019, filed Dec. 11, 2014, granted Apr. 12, 2016 as U.S. Pat. No. 9,309,334, which claims priority to U.S. Ser. No. 61/927,632, filed Jan. 15, 2014, both of which are incorporated by reference.

FIELD OF THE INVENTION

The present invention relates to polypropylene impact copolymers and in particular to polypropylene impact copolymers that have an overall low level of ethylene (or other α-olefin) comonomer present in the ethylene-propylene copolymer for improved Elongation.

BACKGROUND

Commercial polypropylene impact copolymers, industrially referred to as heterophasic copolymers, block copolymers, or simply as "impact copolymers" (ICPs), are typically made in at least two stages series reactors, and typically are "propylene-based" meaning that propylene-derived comonomers or monomers predominate in the ICP. Most ICP's comprise a homopolymer component made in the lead reactor and a copolymer component made in the second reactor to form an intimate polymer blend. The propylene monomer may be polymerized in slurry or gas phase process in the lead reactor. After the polymerization in the lead reactor, the porous polypropylene granules are stripped of the propylene monomer and transferred into a gas phase reactor where the propylene and ethylene comonomers are fed into the reactor to incorporate ethylene-propylene copolymer within the pores of the granules under fluidized conditions.

Because of the limitations of commercially available catalyst systems presently available to incorporate target amount of low ethylene content ethylene-propylene copolymers in the homopolymer granules, the physical properties that can be commercially achieved are also limited, in particular, in the Izod Impact strength and elongation at break, etc.

This invention addresses the means to reliably and commercially manufacture propylene-based heterophasic copolymers that exhibit improved elongation at break, ductility, gloss and impact strength without compromising the stiffness (flexural modulus) of the resulting heterophasic copolymer by control of the copolymer content of the ICP, namely, at copolymer contents of greater than 10 or 15 or 20 wt % in the ICP. Also, the inventive ICP also improves the processability (or "flowability") of ICP granules in the transfer system from the polymerization stage to the finishing area to maintain the preferred production rate.

Related patents and publications include US 2001-034411; US 2010-105848; U.S. Pat. Nos. 8,207,272; 8,067,510; 8,044,135; 7,977,435; 7,935,766; 7,872,074; 7,772,324; 7,348,381; 7,309,742; 7,449,522; 6,660,808; 6,399,707; 6,384,142; 6,087,459; 5,258,464; US 2004/092631; WO 2012/010678; WO 2001/58970; WO 03/044086; WO 99/20663; and WO 98/21275.

SUMMARY

The invention is directed to a propylene-based impact copolymer (ICP) comprising a polypropylene homopolymer and within the range of from 10 wt % to 45 wt % of propylene copolymer based on the weight of the ICP, wherein the copolymer comprises from 20 wt % to 44 wt % ethylene, 1-butene, 1-hexene and/or 1-octene derived units and from 80 to 60 wt % propylene-derived units based on the weight of the propylene copolymer, the propylene-based impact copolymer having a Melt Flow Rate (230° C./2.16 kg) within the range of from 10 g/10 mm to 50 g/10 mm and an Elongation at Break of greater than 60%.

The invention is also directed to a high filler (equal or greater than 5 wt % of the composition) composition comprising within a range from 10 wt % to 50 wt % of a high-comonomer impact copolymer, and within the range of from 5 wt % to 30 wt % of an ethylene-based plastomer, and within the range of from 20 wt % to 80 wt % of the propylene-based impact copolymer, wherein the weight percentages are based on the total weight of the composition.

The invention is also directed to a low filler (less than 5 wt %) composition comprising within the range of from 2 wt % to 25 wt % of an ethylene-based plastomer, within the range of from 2 wt % to 25 wt % of a high-comonomer impact copolymer, and within the range of from 70 wt % to 98 wt % of the propylene-based impact copolymer, wherein the weight percentages are based on the total weight of the composition.

DETAILED DESCRIPTION

Figure 1:
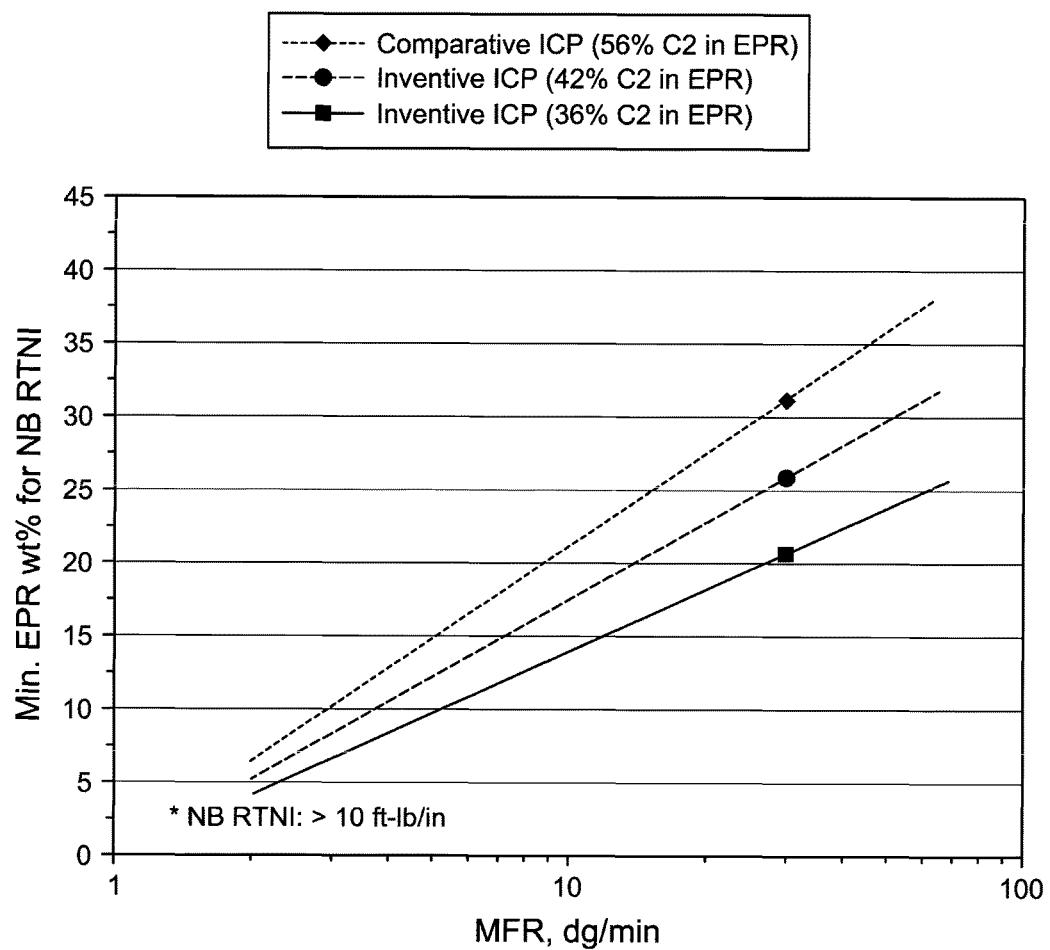
FIG. 1: Minimum ICP product copolymer content for No Break RTNI as a function of Ethylene-in-Copolymer content and ICP

The present invention is directed to propylene-based impact copolymers ("ICP") having a relatively low level of ethylene comonomer incorporation. This is unique because most catalyst systems used to produce the polypropylene component and copolymer components of ICPs tend to incorporate too large an amount of ethylene-derived units (or other comonomer) into the copolymer component. This occurs because most polyolefin catalysts tends to lose activity over time (the active metal center $Ti^{4+}$ changes to $Ti^{3+}$ with resident time in the reactor and the $Ti^{3+}$ site prefers to incorporate ethylene monomer over propylene monomer), thus, a very high incorporating catalyst is used to compensate for this. In addition, most catalyst systems are not able to produce ICP granules with a desirable flowability to prevent clogging in the subsequent polymerization-finishing transfer lines. The inventors have found that an ICP including a propylene copolymer having a relatively low ethylene or other comonomer (less than 45 wt % based on the copolymer) level increases the Elongation and Impact Resistance of the ICP. A magnesium chloride supported titanium catalyst with an external donor described in U.S. Pat. No. 6,087,495 was used to produce the inventive ICP. The improved ICP has a higher porosity in the homopolymer granules which allows for a higher content of the ethylene-propylene copolymer phase. The inventive propylene-based impact copolymer is suitable for applications such as interior trim automotive components in the neat form or as a compounding base to make TPO (thermoplastic olefin) formulations used in the automotive industry such as instrument panel, bumper fascia, glove box bins, etc.

The invention described herein is directed to a propylene-based impact copolymer (ICP) comprising a polypropylene homopolymer and within the range of from 10 or 15 or 20 or 22 or 24 wt % to 26 or 28 or 30 or 35 or 40 or 45 wt % of propylene copolymer based on the weight of the ICP, wherein the copolymer comprises from 20 or 25 or 28 or 30 wt % to 34 or 36 or 38 or 40 or 44 wt % ethylene, 1-butene, 1-hexene and/or 1-octene derived units and from 80 to 56 wt % propylene-derived units based on the weight of the propylene copolymer, the propylene-based impact copolymer having a Melt Flow Rate (230° C./2.16 kg) within the range of from 10 or 15 or 20 or 26 g/10 mm to 30 or 36 or 40 or 50 g/10 mm and an Elongation at Break of greater than 60 or 70 or 80 or 90 or 100% (or within a range from 60 or 80% to 120 or 150 or 300 or 400%).

In a preferred embodiment of the invention, the polypropylene homopolymer portion of the ICP has a molecular weight distribution (Mw/Mn, determined by GPC) within the range of from 3.0 or 3.5 or 4.0 to 4.5 or 5.0 or 6.0 or 7.0 or 8.0 or 9.0; and the propylene copolymer portion of the ICP has a molecular weight distribution (Mw/Mn) within the range of from 3.0 or 3.5 or 4.0 to 4.5 or 5.0 or 6.0 or 7.0 or 8.0 or 9.0. By "polypropylene homopolymer" what is meant is a polymer comprising within the range of from 0.01 or 0.1 or 0.5 to 2.0 or 3.0 wt %, by weight of the polymer, of ethylene or $C_4$ to $C_{10}$ $\alpha$-olefin-derived units, and most preferably refers to a polymer consisting of propylene-derived units. In any embodiment the "propylene copolymer" or "copolymer" is a polymer comprising ethylene, 1-butene, 1-hexene and/or 1-octene derived units, most preferably ethylene derived units.

In any embodiment, the xylene cold soluble fraction of the ICP, which corresponds to the propylene copolymer portion of the ICP, has a number average molecular weight (Mn) within the range from 50,000, or 60,000 g/mole to 80,000, or 100,000 g/mole. In any embodiment, the propylene copolymer has a weight average molecular weight (Mw) within the range from 150,000, or 180,000, or 200,000 g/mole to 300,000,or 350,000, or 400,000 g/mole. And further, the propylene copolymer component has a z-average molecular weight (Mz) within the range from 400,000, or 450,000, or 500,000, or 550,000 g/mole to 650,000, or 700,000, or 800,000, or 900,000 g/mole. The propylene copolymer component has an Mz/Mw of less than 3.0, or 2.8, or 2.6, or 2.4, or within a range from 2.0 to 2.5, or 2.6, or 2.8.

The inventive ICP is heterogeneous, meaning that there are domains of copolymer within a continuous phase of polypropylene homopolymer. Advantageously, the copolymer domains are relatively small, and the two domains are more miscible than prior art ICP heterogeneous domains. Thus, in preferred embodiments of the invention the polypropylene homopolymer forms a continuous phase and the copolymer, preferably an ethylene-propylene copolymer, forms copolymer domains having an average size within the range of from 0.40 or 0.45 or 0.50 μm to 0.80 or 0.85 or 0.90 μm. Due to this nature of the inventive ICP, the surface of the solid material may have improved gloss, and thus, the Gloss (60°) is within a range of from 35 or 40 to 85 or 90 (ASTM D523).

The inventive ICP can desirably be made in a reactor in granules without further processing if desired. Thus, the impact copolymer in a preferred embodiment comprise reactor grade granules having an average particle size within the range of from 1200 or 1300 or 1400 or 1500 μm to 2000 or 2400 or 2800 μm and produced at a rate greater than 30,000 or 35,000 or 40,000 or 45,000 lbs/hr (13,620 kg/hr or 15,890 kg/hr or 18,160 kg/hr or 20,430 kg/hr). There are any number of ways of making the inventive ICP, but preferably it is manufactured in a two-step, sequential processes that utilizes a solution or slurry-type polymerization process in the presence of a polymerization catalyst, followed by transfer of the homopolymer-active catalyst to a gas phase reactor where it is further contacted with $\alpha$-olefin comonomer and propylene to form the copolymer domains within the continuous phase of polypropylene homopolymer. Such processes, individually, are well known in the art, and described for instance in U.S. Pat. No. 8,076,419.

When manufacturing either the homopolymer or copolymer, the properties of each can be tailored to meet certain desired needs to impart desirable final properties in the inventive ICP, and there is a range of desirable properties that the inventive ICP can possess. For instance, the level of hydrogen in the reactor(s) can be adjusted, as can the polymerization temperature, residence time, identity of solvent (if any), as well as other factors.

For example, in preferred embodiments the inventive ICP has a Heat Deflection Temperature within the range of from 70 or 75 or 80 or 85° C. to 95 or 100 or 115 or 125° C.; or greater than 80 or 84 or 86 or 80 or 92° C. Also, in a preferred embodiment the inventive ICP has a Flexural Modulus (1% Secant, ASTM D 790A) within a range of from 120 or 130 or 140 kpsi to 200 or 225 or 250 or 300 kpsi. The Tensile Strength at Yield of the inventive ICP is preferably within the range of from 2500 or 2600 psi to 3500 or 4500 or 5500 psi; or greater than 2800 or 2900 or 3000 or 3200 psi.

One advantage of the inventive ICP is its desirable impact properties. For instance, the Notched Izod Impact at 23° C. as measured by ASTM D256A of the inventive ICP is preferably greater than 4 or 5 or 6 or 8 ft-lb/in (213 J/m or 267 J/m or 320 J/m or 426 J/m) (or within a range from 4 or 5 or 6 or 8 ft-lb/in to 10 or 12 or 14 ft-lb/in; 213 or 426 J/m to 533 or 640 or 693 J/m). Also, the Notched Izod Impact at 23° C. as measured by ISO 180/A is preferably greater than 8 or 10 or 12 or 14 or 20 kJ/m$^2$ (or within a range of from 8 or 10 kJ/m$^2$ to 16 or 20 or 30 or 40 or 50 or 60 kJ/m$^2$).

The invention described herein includes compositions of the ICP with other polymeric materials and common additives. Desirable polymeric materials include polypropylene homopolymers (as defined above), propylene-based elastomers, ethylene-based plastomers, elastomers such as EP rubber, EPDM, butyl rubber, styrenic copolymers and block copolymers, and other impact copolymers, especially so called "high-comonomer" impact copolymers, which are defined as propylene-based impact copolymers having greater than 44 wt % comonomer-derived units in the copolymer portion. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives. These polymeric materials and additives may be compounded with the inventive ICP by traditional blending such as in a Brabender mixer, or extruded in a single or double screw extruder, and can possibly be formed in to a thermoplastic vulcanizate as is well known in the art.

In one embodiment, the inventive composition is a composition that is suitable for an exterior automotive component (car, truck, boat, etc.) comprising (or consisting essentially of) within a range from 10 or 20 or 30 wt % to 40 or 50 wt % of a high-comonomer impact copolymer, and within the range of from 5 or 10 or 15 wt % to 20 or 25 or 30 wt % of an ethylene-based plastomer, and within the range of from 20 or 25 or 30 wt % to 60 or 70 or 80 wt % of the propylene-based impact copolymer, wherein the weight percentages are based on the total weight of the composition. In a preferred embodiment, the composition would also include within the range of from 6 or 10 or 14 wt % to 18 or 22 or 30 wt % filler, most preferably talc, by weight of the composition.

As used herein "consisting essentially of" means that the described/claimed composition does not include any other components that will materially alter its properties by any more than 5% of that property, and in any case, does not include any other component to a level greater than 3 wt %.

Such exterior automotive compositions would have a wide range of desirable properties depending on the level of inventive ICP and other components added. In a preferred embodiment of the invention the composition has a Notched Izod Impact at 23° C. as measured by ISO 180/A of at least 48 or 50 or 52 kJ/m² at 23° C. (or within a range of from 48 or 50 to 52 or 60 kJ/m²); and a Notched Izod Impact of at least 4 or 6 or 8 at −30° C. (or within a range of from 2 or 4 kJ/m² to 10 or 16 kJ/m²). The elongation properties may vary widely, and preferably the inventive composition for exterior automotive components has an Elongation at Break (ISO 527) of at least 70 or 80 or 100 or 200%, or within a range of from 70 or 100% to 200 or 300 or 400 or 500%. Finally, the modulus of the exterior automotive compositions may also vary widely, and preferably have a Flexural Modulus (Chord, ISO 178) of at least 200 or 300 or 500 or 1000 or 1500 MPa, or within a range of from 600 or 800 MPa to 1500 or 2000 or 2500 MPa.

Another embodiment of the inventive composition is a composition that is suitable for interior automotive components comprising (or consisting essentially of) within the range of from 2 or 4 or 8 wt % to 14 or 18 or 25 wt % of an ethylene-based plastomer, within the range of from 2 or 4 or 8 wt % to 14 or 18 or 25 wt % of a high-comonomer impact copolymer, and within the range of from 70 or 75 or 80 or 85 wt % to 90 or 95 or 98 wt % of the propylene-based impact copolymer, wherein the weight percentages are based on the total weight of the composition. In a preferred embodiment of the invention, the composition would also include within the range of from 0.5 or 1.0 wt % to 2.0 or 2.5 or 3.0 or 6.0 wt % talc by weight of the composition.

As with the exterior automotive component composition, the interior automotive compositions would have a wide range of desirable properties depending on the level of inventive ICP and other components added. In a preferred embodiment of the invention the composition has a Notched Izod Impact at 23° C. as measured by ISO 180/A of at least 48 or 50 or 52 kJ/m² at 23° C. (or within a range of from 48 or 50 to 52 or 60 kJ/m²); and a Notched Izod Impact of at least 4 or 6 or 8 at −30° C. (or within a range of from 2 or 4 kJ/m² to 10 or 16 kJ/m²). The Elongation at Break (ISO 527) of the inventive interior composition is preferably at least 60 or 70 or 80 or 100 or 200 or 400 or 600 or 800%, or within a range of from 60 or 70% to 100 or 200 or 400 or 600 or 800 or 1000%. Also, the interior automotive composition would desirably have a Flexural Modulus (Chord, ISO 178) of at least 500 or 700 or 800 MPa, or within a range of from 500 or 700 MPa to 1000 or 1500 or 2000 MPa.

The various descriptive elements and numerical ranges disclosed herein for the propylene-based impact copolymers and compositions including the inventive ICP can be combined with other descriptive elements and numerical ranges to describe the invention; further, for a given element, any upper numerical limit can be combined with any lower numerical limit described herein. The features of the invention are demonstrated in the following non-limiting examples.

EXAMPLES

Melt Flow Rate (MFR): MFR was measured as per ASTM D1238, condition L or ISO 1133B at 230° C. and 2.16 kg load using a melt indexer. The "Melt Index", such as for the plastomer in the compositions, is tested similarly at 190° C.

Flexural Modulus: The flexural modulus was measured according to ASTM D790, using a crosshead speed of 1.27 mm/min, and a support span of 50 mm using an Instron machine. The flexural modulus chord was measured as per ISO 178 test method, at a cross-head speed of 2 mm/min and 64 mm support span using an Instron machine.

Tensile Strength: The tensile strength at yield, elongation at yield and elongation at break were measured as per ASTM D638 or ISO 527, with a crosshead speed of 50 mm/min, using an Instron Machine.

Notched Izod Impact Strength: The Notched Izod impact strength was measured as per ASTM D256 or ISO 180-1/1eA, using equipment made by Empire Technologies Inc.

Heat deflection Temperature (HDT): The HDT was measured according to ASTM D648 or ISO 75, using a load of 0.45 MPa or 1.8 MPa.

Gardner Impact strength: The Gardner impact strength at −29° C. was measured as per ASTM D5420 on a 3.2 mm thickness and 89 mm diameter round disk.

Instrumented Impact Testing: The total energy absorbed under instrumented impact conditions were run as per ASTM D3763 on a 3.2 mm thickness and 102 mm diameter round disk, using either at 5 or 15 mph test speed.

Gloss: The gloss was measured as per ASTM D523 on a 3.2 mm thickness and 89 mm diameter round disk using a glossimeter.

Rockwell Hardness: The Rockwell Hardness was measured as per ASTM D785 on a 3.2 mm thickness and 89 mm diameter round disk.

The polypropylene resin was produced in a bulk continuous pilot scale reactor. Magnesium chloride supported titanium catalysts were supplied by Toho Titanium Company, and the catalyst solid was used with an external donor described in U.S. Pat. 6,087,495. The donor system was a blend of dicyclopentyl dimethoxy silane and propyl triethoxy silane. Catalyst preparation was carried out continuously in situ by contacting the catalyst solids, triethylaluminum, and the donor system under conditions known in the art to yield active, stereospecific catalyst for polymerization of propylene. The activated catalyst was continuously fed to a prepolymerization reactor where it was continuously polymerized in propylene to a productivity of approximately 100 to 400 g-polymer/g-cat. The prepolymerized catalyst was then continuously fed to a bulk slurry reactor, and polymerization continued at 70° C. to 80° C., for a residence time of about 110 minutes. Hydrogen was used in the reactor to control the melt flow rate of the polypropylene homopolymer resin.

The reaction slurry (homopolymer granules in bulk propylene) was removed from the reactor and the homopolymer granules were continuously separated from the liquid propylene. The homopolymer granules were separated from the unreacted monomer and fed into a gas phase reactor.

The granules from the bulk reactor, after removing the monomer, are fed to a gas phase reactor (GPR) where polymerization continued under conditions known in the art to produce ethylene-propylene copolymer within the interstitial pores of the homopolymer granules. The catalyst activity in the gas phase reactor was controlled by both an anti-static agent and a catalyst surface poisoning agents to control the composition of the ethylene-propylene copolymer. The final product, referred to in the art as an "impact copolymer," was continuously withdrawn from the gas phase reactor and separated from unreacted monomer to produce a granular product for compounding and mechanical property testing. The molecular weight of the ethylene-propylene copolymer or more appropriately, Intrinsic Viscosity (IV) of the rubber phase was controlled by the concentration of hydrogen in the gas phase reactor.

The copolymer granules thus obtained are stabilized with 0.15 wt % frganoxTM 1010, 0.05 wt % Ultranox™ 626A, and 0.10 wt % sodium benzoate (fine form), then pelletized on a 30 mm Werner & Pfleiderer twin screw extruder. The pellets were injection molded into ASTM test specimens using a 120 ton Van Dorn injection molding machine and ISO test specimens using a 110 ton Van Dorn injection molding machine. The physical properties were tested, respectively, as per ASTM and ISO guidelines. Test results of Examples 1-6 are in Tables 1 to 4. In the Tables, the "IV ratio" is the Intrinsic Viscosity ratio and is the IV of the ethylene-propylene copolymer phase/IV of the homopolymer phase.

For the compounded products, Examples 7, 8 and 9 in Tables 6-8, the base ICP resins were compounded in a second step by melt blending with additional and different impact copolymer, plastomer, talc and other additive components in a twin screw extruder and pelletized. The pellets were injection molded into ISO or ASTM test specimens for physical properties. These examples are suitable for interior automotive components.

Examples 3, 4 and 5 are the most preferred embodiments of the inventive ICP.

TABLE 1

ICP and its Properties

|  | Test Method | Example 1 | Example 2 |
|---|---|---|---|
| Resin Properties | | | |
| Melt Flow Rate (230° C./2.16 kg) | D 1238 | 29 | 30 |
| Ethylene-propylene copolymer (wt %) | | 26.0 | 27.3 |
| Ethylene in the Ethylene-propylene copolymer (wt %) | | 45.4 | 42.9 |
| IV Ratio | | 3.1 | 3.2 |
| Mechanical | | | |
| Tensile Strength at Yield (psi) | D 638 | 2944 | 2893 |
| Elongation at Yield (%) | D 638 | 5.3 | 5.6 |
| Elongation at Break (%) | D 638 | 65 | 67 |
| Tensile Strength at Yield (MPa) 50 mm/min | ISO 527 | 19 | 19 |
| Tensile Strength at Ultimate (MPa) 50 mm/min | ISO 527 | 14 | 14 |
| Elongation at Yield (%) 50 mm/min | ISO 527 | 5 | 5 |
| Elongation at Break (%) 50 mm/min | ISO 527 | 58 | 69 |
| Flexural Modulus, 1% Secant (kpsi) | D 790A | 150 | 145 |
| Flexural Modulus, 1% Secant (kpsi) | D 790B | 168 | 162 |
| Flexural Modulus, Chord (MPa) 2 mm/min | ISO 178 | 1042 | 1029 |
| Rockwell Hardness (R-Scale) | D 785 | 80 | 77 |
| Heat Deflection Temperature at 66 psi (° C.) | D 648 | 96 | 94 |
| Gloss | D 523 | | |
| at 60° | | 67 | 69 |
| Impact | | | |
| Notched Izod Impact (ft-lb/in) | D 256A | | |
| at 23° C. | | 12.1 | 12.4 |
| at −18° C. | | 2.0 | 2.1 |
| Notched Izod Impact (kJ/m$^2$) | ISO 180/A | | |
| at 23° C. | | 48 | 48 |
| at −20° C. | | 8.6 | 8.5 |
| at −40° C. | | 6.6 | 6.7 |
| Notched Charpy Impact (kJ/m$^2$) | ISO 179-1/1eA | | |
| at 23° C. | | 23 | 20 |
| at −20° C. | | 10.2 | 10.1 |
| at −40° C. | | 7.8 | 7.0 |
| Gardner Impact Strength 0.125 in thick disk at −29° C. (in-lb) | D 5420 | >320 | 301 |
| Instrumented Impact (ft-lb) | ASTM D3763 | | |
| 6.6 m/s (15 mph/25 lb) at 23° C. | | 26.4 (10D) | 26 (10D) |
| 6.6 m/s (15 mph/25 lb) at −20° C. | | 33.1 (6D, 4DB) | 34.1 (9D, 1DB) |
| 6.6 m/s (15 mph/25 lb) at −30° C. | | 30.8 (5D, 5DB) | 32.6 (5D, 3DB, 1BD, 1B) |

Failure Modes
D: Ductile;
DB: Ductile-Brittle;
BD: Brittle-Ductile;
B: Brittle

TABLE 2

| ICP and its Properties | | | |
|---|---|---|---|
| | Example 3 | Example 4 | Example 5 |
| Resin Properties | | | |
| Melt Flow Rate (230° C./2.16 kg) | 30 | 31 | 34 |
| Ethylene-propylene copolymer (wt %) | 25.5 | 27.4 | 26.5 |
| Ethylene in ethylene-propylene copolymer (wt %) | 39.4 | 32.5 | 30.1 |
| IV Ratio | 3.6 | 3.1 | 3.0 |
| Mechanical | | | |
| Tensile Strength at Yield (psi) | 3124 | 3020 | 3131 |
| Elongation at Yield (%) | 5.5 | 7.0 | 7.5 |
| Elongation at Break (%) | 79 | 127 | 193 |
| Tensile Strength at Yield (MPa) 50 mm/min | 22 | 22 | 21 |
| Tensile Strength at Ultimate (MPa) 50 mm/min | 16 | 16 | 16 |
| Elongation at Yield (%) 50 mm/min | 4 | 6 | 6 |
| Elongation at Break (%) 50 mm/min | 79 | 237 | 319 |
| Flexural Modulus, 1% Secant (kpsi) | 156 | 149 | 144 |
| Flexural Modulus, 1% Secant (kpsi) | 177 | 162 | 163 |
| Flexural Modulus, Chord (MPa) 2 mm/min | 1053 | 1045 | 1019 |
| Rockwell Hardness (R-Scale) | 71 | 64 | 66 |
| Heat Deflection Temperature at 66 psi (° C.) | 91 | 90 | 89 |
| Gloss | | | |
| at 60° | 67 | 84 | 87 |
| Impact | | | |
| Notched Izod Impact (ft-lb/in) | | | |
| at 23° C. | 11.1 | 11.6 | 10.7 |
| at −18° C. | 1.7 | 1.7 | 1.3 |
| Notched Izod Impact (kJ/m$^2$) | | | |
| at 23° C. | 23 | 42 | 44 |
| at −20° C. | 8.2 | 6.8 | 8.0 |
| at −40° C. | 7.8 | 5.4 | 6.7 |
| Notched Charpy Impact (kJ/m$^2$) | | | |
| at 23° C. | 20 | 26 | 47 |
| at −20° C. | 9.7 | 7.3 | 7.8 |
| at −40° C. | 6.4 | 3.5 | 5.7 |
| Gardner Impact Strength 0.125 in thick disk at −29° C. (in-lb) | 251 | 258 | 243 |
| Instrumented Impact (ft-lb) | | | |
| 6.6 m/s (15 mph/25 lb) at 23° C. | 27.5 (10D) | 27.4 (10D) | 27.1 (10D) |
| 6.6 m/s (15 mph/25 lb) at −20° C. | 28.3 (2D, 7DB, 1BD) | 31.2 (10D) | 30.6 (6D, 1DB, 3BD) |
| 6.6 m/s (15 mph/25 lb) at −30° C. | 30.5 (10DB) | 20.3 (5D, 4DB, 1BD) | 27.2 (3D, 5DB, 1BD) |

Failure Modes
D: Ductile;
DB: Ductile-Brittle;
BD: Brittle-Ductile;
B: Brittle

TABLE 3

| ICP and its Properties | |
|---|---|
| | Comparative Example 1 |
| Resin Properties | |
| Melt Flow Rate (230° C./2.16 kg) | 30 |
| Ethylene-propylene rubber (wt %) | 26.2 |
| Ethylene in ethylene-propylene copolymer (wt %) | 57.5 |
| IV Ratio | 3.1 |
| Mechanical | |
| Tensile Strength at Yield (psi) | 2930 |
| Elongation at Yield (%) | 4.0 |
| Elongation at Break (%) | 19 |
| Tensile Strength at Yield (MPa) 50 mm/min | 18 |

TABLE 3-continued

ICP and its Properties

| | Comparative Example 1 |
|---|---|
| Tensile Strength at Ultimate (MPa) 50 mm/min | 16 |
| Elongation at Yield (%) 50 mm/min | 3 |
| Elongation at Break (%) 50 mm/min | 9 |
| Flexural Modulus, 1% Secant (kpsi) | 162 |
| Flexural Modulus, 1% Secant (kpsi) | 183 |
| Flexural Modulus, Chord (MPa) 2 mm/min | 1077 |
| Rockwell Hardness (R-Scale) | 67 |
| Heat Deflection Temperature at 66 psi (° C.) | 92 |
| Gloss | |
| at 60° | 31 |
| Impact | |
| Notched Izod Impact (ft-lb/in) | |
| at 23° C. | 3.0 |
| at −18° C. | 1.5 |
| Notched Izod Impact (kJ/m$^2$) | |
| at 23° C. | 13 |
| at −20° C. | 8.1 |
| at −40° C. | 6.7 |
| Notched Charpy Impact (kJ/m$^2$) | |
| at 23° C. | 13 |
| at −20° C. | 8.2 |
| at −40° C. | 6.4 |
| Gardner Impact Strength 0.125 in thick disk at −29° C. (in-lb) | 283 |
| Instrumented Impact (ft-lb) | |
| 6.6 m/s (15 mph/25 lb) at 23° C. | 26.2 (10D) |
| 6.6 m/s (15 mph/25 lb) at −20° C. | 27.6 (1D, 8DB, 1BD) |
| 6.6 m/s (15 mph/25 lb) at −30° C. | 28.2 (7DB, 3BD) |

Failure Modes
D: Ductile;
DB: Ductile-Brittle;
BD: Brittle-Ductile;
B: Brittle

TABLE 4

ICP and its Properties

| | Test Method | Example 6 | Comparative Example 2 |
|---|---|---|---|
| Resin Properties | | | |
| Melt Flow Rate (230° C./2.16 kg) | D 1238 | 30 | 30 |
| Ethylene-propylene copolymer (wt %) | EMCC | 22.8 | 23 |
| Ethylene in ethylene-propylene copolymer (wt %) | EMCC | 43.0 | 56 |
| IV ratio | EMCC | 2.9 | N/A |
| Mechanical | | | |
| Tensile Strength at Yield (MPa) 50 mm/min | ISO 527 | 21 | 21 |
| Elongation at Yield (%) 50 mm/min | ISO 527 | 4.7 | 4.1 |
| Elongation at Break (%) 50 mm/min | ISO 527 | 28 | 30 |
| Flexural Modulus, Chord (MPa) 2 mm/min, 64 mm span | ISO 178 | 1115 | 1129 |
| Thermal | | | |
| Heat Deflection Temperature at 0.45 MPa flatwise (° C.) | ISO 75 | 86 | — |
| Heat Deflection Temperature at 1.8 MPa flatwise (° C.) | ISO 75 | 52 | 48 |
| Impact | | | |
| Notched Izod Impact (kJ/m$^2$) | ISO 180/A | | |
| at 23° C. | | 16.8 | 11 |
| at −30° C. | | 5.2 | — |
| at −40° C. | | 5.2 | 4.2 |
| Notched Charpy Impact (kJ/m$^2$) | ISO 179-1/1eA | | |
| at 23° C. | | 15.4 | 10.6 |
| at −30° C. | | 5.9 | — |
| at −40° C. | | 3.7 | 2.5 |
| Instrumented Impact (J) at 15 mph | ASTM D3763 | | |
| at 23° C. | | 19.9 (10D) | 20.3 (9D, 1DB) |
| at 0° C. | | 25 (10D) | 22.3 (3D, 1DB, 1BD, 5B) |
| at −15° C. | | 28.9 (7D, 3B) | — |
| at −20° C. | | 26.5 (5D, 1BD, 4B) | — |

TABLE 4-continued

| ICP and its Properties | | | |
|---|---|---|---|
| | Test Method | Example 6 | Comparative Example 2 |
| Shrinkage (%) | FHSOP-84 | | |
| 50% Pack Pressure | | 1.81 | 2.02 |
| 75% | | 1.63 | 1.82 |
| 100% | | 1.49 | 1.65 |

Failure Modes
D: Ductile;
DB: Ductile-Brittle;
BD: Brittle-Ductile;
B: Brittle

TABLE 5

| Description of ICP Composition Components | |
|---|---|
| Ingredient | Description |
| Basestock Resin | Inventive ICP or Comparative Example ICP used in compounding formulations |
| PP7032E2 | Commercial ICP with MFR of 4.0 g/10 min, with an overall ethylene-propylene content of 18 wt %, and ethylene of the copolymer of 53 wt % (ExxonMobil Chemical Co.) |
| PP7905E1 | Commercial ICP with MFR of 100 g/10 min, with an overall ethylene-propylene content of 8.5 wt %, and ethylene content of the copolymer of 45 wt % (ExxonMobil Chemical Co.) |
| Engage ™ 8200 | Ethylene-Octene copolymer (Plastomer), Melt Index 5 g/10 min, density 0.87 g/cm$^3$ (DOW Chemical Co.) |
| Engage ™ 8842 | Ethylene-Octene copolymer (Plastomer), Melt Index 1 g/10 min, density 0.857 g/cm$^3$ (DOW Chemical Co.) |
| Jetfil ™ 700C | Talc supplied by Specialty Minerals Co. |
| IR-1010 (Irganox ™ 1010) | Primary anti-oxidant [Tetrakis(3-(3,5-di-tert butyl-4-hydroxyphenyl)propionate))] |
| IR-168 (Irgafos ™ 168) | Secondary anti-oxidant [Tris(2,4-di-tert-butyl phenyl) phosphite] |
| Ampacet ™ 49974 | Carbon black masterbatch from Ampacet Co. |
| Kemamide ™ VO | Slip agent from Chemtura Chemicals Co. |
| Baerlocher ™ 8577 | Zinc stearate from Baerlocher |
| Atmer ™ 129 | Glycerol monostearate from Croda Chemical Co. |

TABLE 6

| Compositions of the ICP | | | |
|---|---|---|---|
| | Test Method | Example 7 | Comparative Example 3 |
| Composition Property | | | |
| Melt Flow Rate (230° C./2.16 kg) | | 31 | 31 |
| Ethylene-propylene copolymer (wt %) | | 26.1 | 26 |
| Ethylene in ethylene-propylene copolymer (wt %) | | 38.4 | 56 |
| IV Ratio | | 2.9 | 3.3 |
| Compound Formulation | | | |
| Basestock Resin | | 76.15% | 76.15% |
| PP7032E2 high-comonomer ICP | | 12% | 12% |
| Engage 8200 | | 10% | 10% |
| Jetfil 700C | | 1% | 1% |
| IR-1010 | | 0.10% | 0.10% |
| IR-168 | | 0.05% | 0.05% |
| Baerlocher 8577 (ZnSt) | | 0.05% | 0.05% |
| Ampacet 49974 (carbon black) | | 0.55% | 0.55% |
| Kemamide VO | | 0.10% | 0.10% |
| Compound Properties | | | |
| Total bi-polymer (Reactor made EPR + Plastomer) | | 32.0% | 31.9% |
| Melt Flow Rate (230° C./2.16 kg) | | 21 | 22 |

TABLE 6-continued

| | Test Method | Example 7 | Comparative Example 3 |
|---|---|---|---|
| Compositions of the ICP | | | |
| Mechanical | | | |
| Tensile Strength at Yield (MPa) 50 mm/min | ISO 527 | 19 | 19 |
| Elongation at Yield (%) 50 mm/min | ISO 527 | 6.1 | 4.4 |
| Elongation at Break (%) 50 mm/min | ISO 527 | 830 | 61 |
| Flexural Modulus, Chord (MPa), 2 mm/min, 64 mm span | ISO 178 | 950 | 1005 |
| Thermal | | | |
| Heat Deflection Temperature at 0.45 MPa flatwise (° C.) | ISO 75 | 76 | 80 |
| Impact | | | |
| Notched Izod Impact (kJ/m$^2$) | ISO 180/A | | |
| at 23° C. | | 52 | 52 |
| at 10° C. | | 50 | 16 |
| at −30° C. | | 9 | 7 |
| Instrumented Impact (J) at 5 mph | ASTM D3763 | | |
| at −30° C. | | 24 (10D) | 26 (9D, 1BD) |
| at −40° C. | | 28 (9D, 1BD) | 29 (3D, 1BD, 6B) |
| Instrumented Impact (J) at 15 mph | ASTM D3763 | | |
| at −20° C. | | 25 (10D) | 24 (7D, 3DB) |
| at −30° C. | | 23 (5D, 3BD, 2B) | 23 (10B) |
| Shrinkage, 2.8 mm thickness (%) Average 50%/75% Pack Pressure | FHSOP-84 | 1.23 | 1.48 |

Failure Modes
D: Ductile;
DB: Ductile-Brittle;
BD: Brittle-Ductile;
B: Brittle

TABLE 7

| | Test Method | Example 8 | Comparative Example 4 |
|---|---|---|---|
| Compositions of the ICP | | | |
| Composition Properties | | | |
| Melt Flow Rate (230° C./2.16 kg) | | 30 | 31 |
| Ethylene-propylene copolymer (wt %) | | 27.3 | 26 |
| Ethylene in ethylene-propylene copolymer (wt %) | | 42.9 | 56 |
| IV Ratio | | 3.2 | 3.3 |
| Compound Formulation | | | |
| Basestock Resin | | 93.0% | 91.5% |
| Engage 8200 | | 3.6% | 5.1% |
| Jetfil 700C | | 2.1% | 2.1% |
| IR-1010 | | 0.3% | 0.3% |
| IR-168 | | 0.1% | 0.1% |
| Ampacet 49974 (carbon black) | | 0.8% | 0.8% |
| Kemamide VO | | 0.1% | 0.1% |
| Compound Properties | | | |
| Total bi-polymer (Reactor made EPR + Plastomer) | | 29.0% | 28.9% |
| Melt Flow Rate (230° C./2.16 kg) | ISO 1133B | 27 | 32 |
| Mechanical | | | |
| Tensile Strength at Yield (MPa) 50 mm/min | ISO 527 | 17 | 18 |
| Elongation at Yield (%) 50 mm/min | ISO 527 | 5.1 | 3.3 |
| Elongation at Break (%) 50 mm/min | ISO 527 | 76 | 14 |
| Flexural Modulus, Chord (MPa), 2 mm/min, 64 mm span | ISO 178 | 890 | 1061 |

TABLE 7-continued

| | | Compositions of the ICP | |
|---|---|---|---|
| | Test Method | Example 8 | Comparative Example 4 |
| Flexural Strength, Chord (MPa), 2 mm/min, 64 mm span | ISO 178 | 22 | 25 |
| Thermal | | | |
| Heat Deflection Temperature at 0.45 MPa flatwise (° C.) | ISO 75 | 77 | 85 |
| Heat Deflection Temperature at 1.8 MPa flatwise (° C.) | ISO 75 | 48 | 51 |
| Impact | | | |
| Notched Izod Impact (kJ/m$^2$) | ISO 180-1/1eA | | |
| at 23° C. | | 50 | 14 |
| at −30° C. | | 6 | 6 |
| Instrumented Impact (J) at 15 mph | ASTM D3763 | | |
| at 0° C. | | 25 (10D) | 25 (4D, 3DB, 2BD, 1B) |
| at 10° C. | | — | 23 (7D, 3DB) |
| at −10° C. | | 26 (10D) | — |

Failure Modes
D: Ductile;
DB: Ductile-Brittle;
BD: Brittle-Ductile;
B: Brittle

TABLE 8

| | | Compositions of the ICP | |
|---|---|---|---|
| | Test Method | Example 9 | Comparative Example 5 |
| Resin Properties | | | |
| Melt Flow Rate (230° C./2.16 kg) | | 30 | 31 |
| Ethylene-propylene copolymer (wt %) | | 27.3 | 26 |
| Ethylene in ethylene-propylene copolymer (wt %) | | 42.9 | 56 |
| IV Ratio | | 3.2 | 3.3 |
| Compound Formulation | | | |
| Basestock Resin | | 35.7% | 35.2% |
| PP7905E1 high-comonomer ICP | | 29.7% | 29.7% |
| Engage 8842 | | 16.5% | 17.0% |
| Jetfil 700C | | 16.5% | 16.5% |
| IR-1010 | | 0.3% | 0.3% |
| IR-168 | | 0.1% | 0.1% |
| Ampacet 49974 (carbon black) | | 0.8% | 0.8% |
| Atmer 129 | | 0.1% | 0.1% |
| Kemamide VO | | 0.3% | 0.3% |
| Compound Properties | | | |
| Total bi-polymer (Reactor made EPR + Plastomer) | | 28.8% | 28.7% |
| Melt Flow Rate (230° C./2.16 kg) | ISO 1133B | 30 | 30 |
| Mechanical | | | |
| Tensile Strength at Yield (MPa) 50 mm/min | ISO 527 | 18 | 18 |
| Elongation at Yield (%) 50 mm/min | ISO 527 | 4.3 | 3.4 |
| Elongation at Break (%) 50 mm/min | ISO 527 | 105 | 44 |
| Flexural Modulus, Chord (MPa) 2 mm/min, 64 mm span | ISO 178 | 1579 | 1698 |
| Flexural Strength, Chord (MPa) 2 mm/min, 64 mm span | ISO 178 | 25 | 27 |
| Thermal | | | |
| Heat Deflection Temperature at 0.45 MPa flatwise (° C.) | ISO 75 | 102 | 102 |
| Heat Deflection Temperature at 1.8 MPa flatwise (° C.) | ISO 75 | 55 | 53 |

TABLE 8-continued

Compositions of the ICP

| | Test Method | Example 9 | Comparative Example 5 |
|---|---|---|---|
| Impact | | | |
| Notched Izod Impact (kJ/m$^2$) | ISO 180-1/1eA | | |
| at 23° C. | | 55 | 35 |
| at −30° C. | | 7 | 7 |
| Instrumented Impact (J) at 5 mph | ASTM D3763 | | |
| at −20° C. | | — | 27 (8D, 2DB) |
| at −30° C. | | 30 (9D, 1B) | 29 (1D, 4DB, 3BD, 2B) |
| at −40° C. | | 31 (6D, 1DB, 2BD, 2B) | — |

The inventive ICP allows an expanded ICP product design space, due to the lower ethylene in the ethylene-propylene copolymer or rubber phase while subsequently not fouling commercial process equipment. Thus, relative to the Comparative Examples (below), this allows a lower ICP copolymer (EPR proportion in the ICP) content or a higher final ICP MFR to achieve the same impact strength as the Comparative Examples (see FIG. 1). Per FIG. 1, at 30 g/10 min MFR of ICP, to maintain the No Break RTNI property, one can achieve this at 31 wt % copolymer at 56 wt % ethylene-in-copolymer OR at 26 wt % copolymer at 42 wt % ethylene-in-copolymer or at 21 wt % copolymer at 36 wt % ethylene-in-copolymer.

Figure 2:
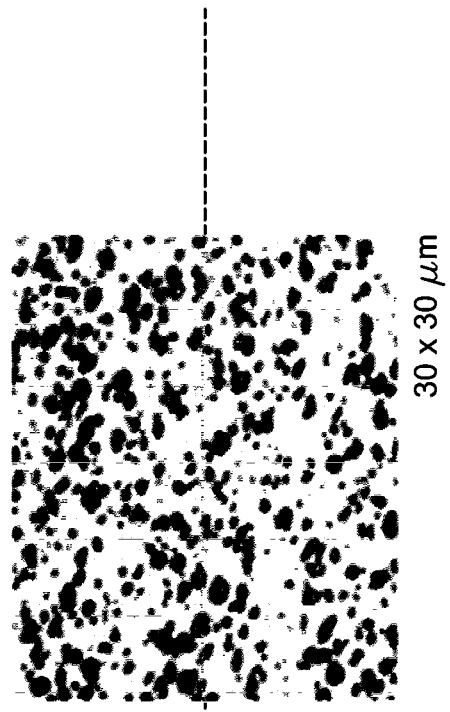
FIG. 2: AFM Micrograph comparison of the effect of lowering ICP Ethylene-in-Copolymer content of example 16 and comparative example 10, both on the same scale.
Figure 2:
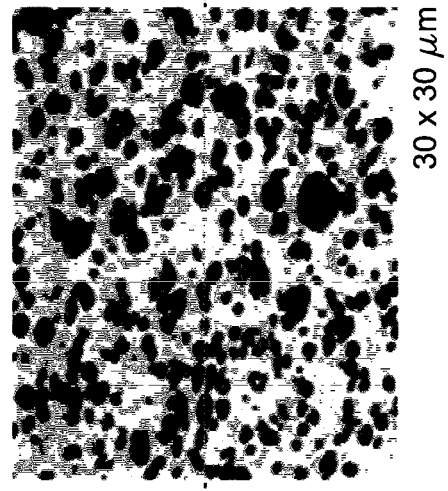

The Comparative Examples 1 is a commercial ICP sample, with a target MFR of 30 g/10 mm and EP copolymer content of 26 wt % and an ethylene in the EP copolymer of greater than 50 wt %. In the Examples 1-6, the inventive examples, have the same MFR and EP copolymer content as a Comparative Example 1, except the ethylene content in the EP copolymer was lowered to equal or below 45 wt %. Due to this change in the composition of the EP copolymer phase, the physical properties such as elongation at break, Izod and Charpy impact strength were significantly improved with minimal loss in flexural modulus and tensile at yield. The lower ethylene in the EP copolymer helps the elastomer phase disperse better in comparison to the Comparative Example 1, as evidenced in the micrographs of FIG. 2 below.

The Comparative Example 2 is a commercial ICP, with a target MFR of 30 g/10 mm and EP copolymer content of 23 wt % and an ethylene in the EP copolymer of 56 wt %. The comparative ICP is made using control rheology, or viscosity breaking by peroxide, method from MFR of 16 g/10 mm in order to enhance the impact strength. ICP products made using control rheology method is undesirable due to the generation of higher level of VOC (volatile organic compounds) and color formation. In the Example 6, the inventive example was made without using control rheology method, has the same MFR and EP copolymer content as a Comparative Example 2, except the ethylene content in the EP copolymer was lower. Due to this change in the composition of the EP copolymer phase, the physical properties such as elongation at break, Izod and Charpy impact strength were significantly improved with minimal loss in flexural modulus. The notched Izod Impact strength as measured at 23° C. for Example 6 was 16.8 kJ/m$^2$, while for the Comparative Example 2 it was only 11 kJ/m$^2$. In addition, the Instrumented Impact test at 15 mph shows the failure mode at 0° C. to be 100% ductile in comparison to 30% ductile for Comparative Example 2. Similar differences are observed at other temperatures and at 5 mph test speed. In addition, the mold shrinkage for Example 8 were lower in comparison to the Comparative Example 5, at average back pressures of 50/75/100%.

The inventive ICP samples were compounded into thermoplastic polyolefin compositions in Examples 7-9 and compared to the Comparative Examples 3-5 compositions comprising the Comparative Example 1 commercial ICP. The improvement on physical properties such as elongation at break, Izod impact strength, and cold temperature instrumented impact ductility observed on the base ICP were translated to the compounded TPO compositions.

Further analysis was performed on the inventive ICP by Gel Permeation Chromatography. In particular, the xylene cold soluble fraction ("CSF"), or the ethylene-propylene copolymer (propylene copolymer) portion was isolated and analyzed by GPC. The xylene CSF, which in the case of the inventive ICP will correspond to the propylene copolymer (ethylene-propylene copolymer), was determined by solubility in xylene at 135° C. The procedure was as follows. Weigh out 2 grams of sample (either in pellet or ground pellet form) into 300 ml conical flask. Pour 200 ml of xylene into the conical flask with stir bar and secure the flask on a heating oil bath. The oil bath was heated to allow melting of the polymer by leaving the flask in oil bath at 135° C. for about 15 minutes. When melted, discontinue heating, but continue stirring through the cooling process. The dissolved polymer was allowed to cool spontaneously overnight. The precipitate was filtered with Teflon filter paper and then dried under vacuum at 90° C. Finally, the xylene soluble fraction was calculated by taking the percent by weight of total polymer sample ("A") less precipitate ("B") at room temperature [soluble content=((A−B)/A)×100].

The procedure of ISO 16014-1(4): 2003 was followed to measure the Mn, Mw and Mz of the inventive ICP having an ethylene-propylene copolymer content of 29 wt % based on the weight of the ICP, and the ethylene-propylene copolymer having an ethylene content of 35 wt %, based on the weight of the copolymer. A Waters Alliance GPC 2000 DRI instrument, equipped with refractive index detector and online viscometer was used with three TSK-gel columns (GM-HXL-HT) and 1,2,4-trichlorobenzene (TCB, stabilized with 200 mg/L 2,6-di-tert-butyl-4-methyl-phenol) as solvent at 145° C. and at a constant flow rate of 1 mL/min. An amount of about 200 µL of sample solution was injected per analysis. The column was calibrated using a relative calibration with 19 narrow MWD polystyrene (PS) standards in the range of 0.5 kg/mol to 11 500 kg/mol and a set of well characterized broad polypropylene standards. All samples were prepared by dissolving 5 to 10 mg of ICP in 10 mL (at 160° C.) of stabilized TCB (same as mobile phase) and keeping for 3 hours with continuous shaking prior sampling in the GPC instrument. The results: are in Table 9, which are an average of three measurements of the ICP.

TABLE 9

GPC measurements of Xylene CSF

| Parameter | GPC DRI measurement |
|---|---|
| Mn | 70,000 g/mole |
| Mw | 254,800 g/mole |
| Mz | 609,000 g/mole |
| Mz/Mw | 2.39 (±0.04) |
| Mz/Mn | 8.7 (±0.3) |

Now, having described the various features of the inventive ICP and its compositions, described here in numbered paragraphs is:

P1. A propylene-based impact copolymer (ICP) comprising a polypropylene homopolymer and within the range of from 10 or 15 or 20 or 22 or 24 wt % to 26 or 28 or 30 or 35 or 40 or 45 wt % of propylene copolymer based on the weight of the ICP, wherein the copolymer comprises from 20 or 25 or 28 or 30 wt % to 34 or 36 or 38 or 40 or 44 wt % ethylene, 1-butene, 1-hexene and/or 1-octene derived units and from 80 to 60 wt % propylene-derived units based on the weight of the propylene copolymer, the propylene-based impact copolymer having a Melt Flow Rate (230° C./2.16 kg) within the range of from 10 or 15 or 20 or 26 g/10 mm to 30 or 36 or 40 or 50 g/10 mm and an Elongation at Break of greater than 60 or 70 or 80 or 90 or 100% (or within a range from 60 or 80% to 120 or 150 or 300 or 400%).

P2. The propylene-based impact copolymer of numbered paragraph 1, wherein the polypropylene homopolymer forms a continuous phase and the ethylene-propylene copolymer forms rubber domains having an average size within the range of from 0.40 or 0.45 or 0.50 µm to 0.80 or 0.85 or 0.90 µm.

P3. The propylene-based impact copolymer of numbered paragraphs 1 or 2, wherein the impact copolymer is reactor grade granules having an average particle size within the range of from 1200 or 1300 or 1400 or 1500 µm to 2000 or 2400 or 2800 µm and produced at a rate greater than 30,000 or 35,000 or 40,000 or 45,000 lbs/hr.

P4. The propylene-based impact copolymer of any one of the preceding numbered paragraphs, wherein the Gloss (60°) is within a range from 40 to 90% (ASTM D523).

P5. The propylene-based impact copolymer of any one of the preceding numbered paragraphs, wherein the Heat Deflection Temperature is within the range of from 70 or 75 or 80 or 85° C. to 95 or 100 or 115 or 125 ° C.; or greater than 80 or 84 or 86 or 80 or 92 ° C.

P6; The propylene-based impact copolymer of any one of the preceding numbered paragraphs, wherein the Flexural Modulus (1% Secant, ASTM D 790A) is within a range of from 120 or 130 or 140 kpsi to 200 or 225 or 250 or 300 kpsi.

P7. The propylene-based impact copolymer of any one of the preceding numbered paragraphs, wherein the Tensile Strength at Yield is within the range of from 2500 or 2600 psi to 3500 or 4500 or 5500 psi; or greater than 2800 or 2900 or 3000 or 3200 psi.

P8. The propylene-based impact copolymer of any one of the preceding numbered paragraphs, wherein the Notched Izod Impact at 23° C. as measured by ASTM D256A is greater than 4 or 5 or 6 or 8 ft-lb/in (213 J/m or 267 J/m or 320 J/m or 426 J/m) (or within a range from 6 or 8 ft-lb/in to 10 or 12 or 14 ft-lb/in; 213 or 426 J/m to 533 or 640 or 693 J/m).

P9. The propylene-based impact copolymer of any one of the preceding numbered paragraphs, wherein the Notched Izod Impact at 23° C. as measured by ISO 180/A is greater than 8 or 10 or 12 or 14 or 20 kJ/m$^2$ (or within a range of from 8 or 10 kJ/m$^2$ to 16 or 20 or 30 or 40 or 50 or 60 kJ/m$^2$).

P10. The propylene-based impact copolymer of any one of the preceding numbered paragraphs, wherein the polypropylene homopolymer has a molecular weight distribution (Mw/Mn) within the range of from 3.0 or 3.5 or 4.0 to 4.5 or 5.0 or 6.0 or 7.0 or 8.0 or 9.0; and wherein the propylene copolymer has a molecular weight distribution (Mw/Mn) within the range of from 3.0 or 3.5 or 4.0 to 4.5 or 5.0 or 6.0 or 7.0 or 8.0 or 9.0.

P11. The propylene-based impact copolymer of any one of the preceding numbered paragraphs, wherein the propylene copolymer is a propylene-ethylene copolymer.

P12. A thermoplastic polyolefin composition comprising the propylene-based impact copolymer of any one of the preceding numbered paragraphs.

P13. The composition of numbered paragraph 12, comprising within a range from 10 or 20 or 30 wt % to 40 or 50 wt % of a high-comonomer impact copolymer, and within the range of from 5 or 10 or 15 wt % to 20 or 25 or 30 wt % of an ethylene-based plastomer, and within the range of from 20 or 25 or 30 wt % to 60 or 70 or 80 wt % of the propylene-based impact copolymer, wherein the weight percentages are based on the total weight of the composition.

P14. The composition of numbered paragraphs 12 or 13, having a Notched Izod Impact at 23° C. as measured by ISO 180/A of at least 48 or 50 or 52 kJ/m$^2$ at 23° C. (or within a range of from 48 or 50 to 52 or 60 kJ/m$^2$); and a Notched Izod Impact of at least 4 or 6 or 8 at −30° C. (or within a range of from 2 or 4 kJ/m$^2$ to 10 or 16 kJ/m$^2$).

P15. The composition of any one of numbered paragraphs 12 through 14 having an Elongation at Break (ISO 527) of at least 70 or 80 or 100 or 200%; or within a range of from 70 or 100% to 200 or 300 or 400 or 500%.

P16. The composition of any one of numbered paragraphs 12 through 15, having a Flexural Modulus (Chord, ISO 178) of at least 200 or 300 or 500 or 1000 or 1500 MPa, or within a range of from 600 or 800 MPa to 1500 or 2000 or 2500 MPa.

P17. The composition of any one of numbered paragraphs 12 through 16, further comprising within the range of from 6 or 10 or 14 wt % to 18 or 22 or 30 wt % talc by weight of the composition.

P18. An exterior automotive component comprising (consisting essentially of) the composition of any one of numbered paragraphs 12 through 17.

P19. The composition of numbered paragraph 12, comprising within the range of from 2 or 4 or 8 wt % to 14 or 18 or 25 wt % of an ethylene-based plastomer, within the range of from 2 or 4 or 8 wt % to 14 or 18 or 25 wt % of high-comonomer impact copolymer, and within the range of from 70 or 75 or 80 or 85 wt % to 90 or 95 or 98 wt % of the propylene-based impact copolymer, wherein the weight percentages are based on the total weight of the composition.

P20. The composition of numbered paragraph 19, having a Notched Izod Impact at 23° C. as measured by ISO 180/A of at least 48 or 50 or 52 kJ/m² at 23° C. (or within a range of from 48 or 50 to 52 or 60 kJ/m²); and a Notched Izod Impact of at least 4 or 6 or 8 at −30° C. (or within a range of from 2 or 4 kJ/m² to 10 or 16 kJ/m²).

P21. The composition of any one of numbered paragraphs 19 through 20, having an Elongation at Break (ISO 527) of at least 60 or 70 or 80 or 100 or 200 or 400 or 600 or 800%; or within a range of from 60 or 70% to 100 or 200 or 400 or 600 or 800 or 1000%.

P22. The composition of any one of numbered paragraphs 19 through 21, having a Flexural Modulus (Chord, ISO 178) of at least 500 or 700 or 800 MPa, or within a range of from 500 or 700 MPa to 1000 or 1500 or 2000 MPa.

P23. The composition of any one of numbered paragraphs 19 through 22, further comprising within the range of from 0.5 or 1.0 wt % to 2.0 or 2.5 or 3.0 or 6.0 wt % talc by weight of the composition.

P24. An interior automotive component comprising (or consisting essentially of) the composition the composition of any one of numbered paragraphs 19 through 23.

Also described herein is the use of an ICP in a composition, and especially in an automotive component, the ICP comprising the features of numbered paragraph 1 and any one of numbered paragraph 2 through 11.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A thermoplastic polyolefin composition comprising:
a propylene-based impact copolymer (ICP) comprising a polypropylene homopolymer and within a range of from 10 wt % to 45 wt % of propylene copolymer based on the weight of the ICP, wherein the propylene copolymer comprises from 20 wt % to 44 wt % ethylene, 1-butene, 1-hexene and/or 1-octene derived units and from 80 to 56 wt % propylene-derived units based on the weight of the propylene copolymer, the propylene-based impact copolymer having a melt flow rate (230° C./2.16 kg) within a range of from 10 g/10 min to 50 g/10 min and an elongation at break of greater than 60%; and
an ethylene-based plastomer and/or propylene-based elastomer;
wherein the impact copolymer is reactor grade granules having an average particle size within a range of from 1200 μm to 2800 μm and produced at a rate greater than 30,000 lbs/hr (13,620 kg/hr).

2. The thermoplastic polyolefin composition of claim 1, wherein the polypropylene homopolymer forms a continuous phase and the propylene copolymer forms rubber domains having an average size within a range of from 0.40 μm to 0.90 82 m.

3. The thermoplastic polyolefin composition of claim 1, wherein the propylene-based impact copolymer has a gloss) (60° ) within a range of from 40 to 90% (ASTM D523).

4. The thermoplastic polyolefin composition of claim 1, wherein the propylene-based impact copolymer has a heat deflection temperature is within a range of from 70° C. to 125° C.

5. The thermoplastic polyolefin composition of claim 1, wherein the propylene-based impact copolymer has a flexural modulus (1% Secant, ASTM D 790A) is within a range of from 120 kpsi to 300 kpsi.

6. The thermoplastic polyolefin composition of claim 1, wherein the propylene-based impact copolymer has a tensile strength at yield is within a range of from 2500 psi to 5500 psi.

7. The thermoplastic polyolefin composition of claim 1, wherein the propylene-based impact copolymer has a notched izod impact at 23° C. as measured by ASTM D256A is greater than 4 ft-lb/in (213 J/m).

8. The thermoplastic polyolefin composition of claim 1, wherein the propylene-based impact copolymer has a notched izod impact at 23° C. as measured by ISO 180/A is greater than 8 kJ/m².

9. The thermoplastic polyolefin composition of claim 1, wherein the polypropylene homopolymer has a molecular weight distribution (Mw/Mn) within a range of from 3.0 to 9.0; and wherein the propylene copolymer has a Mw/Mn within a range of from 3.0 to 9.0.

10. The thermoplastic polyolefin composition of claim 1, wherein the propylene copolymer is an ethylene-propylene copolymer.

11. The thermoplastic polyolefin composition of claim 1, comprising within a range from 10 wt % to 50 wt % of a high-comonomer impact copolymer, and within a range of from 5 wt % to 30 wt % of the ethylene-based plastomer, and within a range of from 20 wt % to 80 wt % of the propylene-based impact copolymer, wherein the weight percentages are based on the total weight of the composition.

12. The thermoplastic polyolefin composition of claim 11, having a notched izod impact at 23° C. as measured by ISO 180/A of at least 48 kJ/m² at 23° C.; and
a notched izod impact of at least 4 kJ/m² at −30° C.

13. The thermoplastic polyolefin composition of claim 11, having an elongation at break (ISO 527) of at least 70%.

14. The thermoplastic polyolefin composition of claim 11, having a flexural modulus (chord, ISO 178) of at least 200 MPa.

15. The thermoplastic polyolefin composition of claim 11, further comprising within a range of from 6 wt % to 30 wt % talc by weight of the composition.

16. An exterior automotive component comprising the thermoplastic polyolefin composition of claim 15.

17. The thermoplastic polyolefin composition of claim 1, comprising within a range of from 2 wt % to 25 wt % of an ethylene-based plastomer, within a range of from 2 wt % to 25 wt % of a high-comonomer impact copolymer, and within a range of from 70 wt % to 98 wt % of the propylene-based impact copolymer, wherein the weight percentages are based on the total weight of the composition.

18. The thermoplastic polyolefin composition of claim 17, having a Notched Izod Impact at 23 ° C. as measured by ISO 180/A of at least 48 kJ/m² at 23° C.; and
a Notched Izod Impact of at least 4 kJ/m² at −30° C.

19. The thermoplastic polyolefin composition of claim 17, having an elongation at break (ISO 527) of at least 60%.

20. The thermoplastic polyolefin composition of claim 17, having a, flexural modulus (chord, ISO 178) of at least 500 MPa.

21. The thermoplastic polyolefin composition of claim 17, further comprising within a range of from 0.5 wt % to 6.0 wt % talc by weight of the composition.

22. An interior automotive component comprising the thermoplastic polyolefin composition of claim 21.

23. A thermoplastic polyolefin composition comprising:
a propylene-based impact copolymer (ICP) comprising a polypropylene homopolymer and within a range of from 10 wt % to 45 wt % of propylene copolymer based on the weight of the ICP, wherein the propylene copolymer comprises from 20 wt % to 44 wt % ethylene, 1-butene, 1-hexene and/or 1-octene derived units and from 80 to 56 wt % propylene-derived units based on the weight of the propylene copolymer, the propylene-based impact copolymer having a melt flow rate (230° C./2.16 kg) within a range of from 10 g/10 min to 50 g/10 min and an elongation at break of greater than 60%; and an ethylene-based plastomer and/or propylene-based elastomer;

wherein the polypropylene homopolymer forms a continuous phase and the propylene copolymer forms rubber domains having an average size within a range of from 0.40 μm to 0.90 μm.

24. The thermoplastic polyolefin composition of claim 23, wherein the propylene-based impact copolymer has a gloss) (60° within a range of from 40 to 90% (ASTM D523).

25. The thermoplastic polyolefin composition of claim 23, wherein the propylene-based impact copolymer has a heat deflection temperature is within a range of from 70° C. to 125° C.

26. The thermoplastic polyolefin composition of claim 23, wherein the propylene-based impact copolymer has a flexural modulus (1% Secant, ASTM D 790A) is within a range of from 120 kpsi to 300 kpsi.

27. The thermoplastic polyolefin composition of claim 23, wherein the propylene-based impact copolymer has a tensile strength at yield is within a range of from 2500 psi to 5500 psi.

28. The thermoplastic polyolefin composition of claim 23, wherein the propylene-based impact copolymer has a notched izod impact at 23° C. as measured by ASTM D256A is greater than 4 ft-lb/in (213 J/m).

29. The thermoplastic polyolefin composition of claim 23, wherein the propylene-based impact copolymer has a notched izod impact at 23° C. as measured by ISO 180/A is greater than 8 kJ/m$^2$.

30. The thermoplastic polyolefin composition of claim 23, wherein the polypropylene homopolymer has a molecular weight distribution (Mw/Mn) within a range of from 3.0 to 9.0; and wherein the propylene copolymer has a Mw/Mn within a range of from 3.0 to 9.0.

* * * * *